US007020750B2

(12) United States Patent
Thiyagaranjan et al.

(10) Patent No.: US 7,020,750 B2
(45) Date of Patent: Mar. 28, 2006

(54) HYBRID SYSTEM AND METHOD FOR UPDATING REMOTE CACHE MEMORY WITH USER DEFINED CACHE UPDATE POLICIES

(75) Inventors: Pirasenna Thiyagaranjan, Santa Clara, CA (US); Krishnendu Chakraborty, San Mateo, CA (US); Peter D. Stout, San Jose, CA (US); Xuesi Dong, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 148 days.

(21) Appl. No.: 10/246,613

(22) Filed: Sep. 17, 2002

(65) Prior Publication Data
US 2004/0054854 A1  Mar. 18, 2004

(51) Int. Cl.
*G06F 12/00* (2006.01)
(52) U.S. Cl. .................. 711/141; 711/113; 711/119; 711/120; 711/126; 711/134; 711/141; 709/203; 709/213; 709/217; 709/218; 709/219; 709/246
(58) Field of Classification Search ............... 711/112, 711/113–146, 159; 707/8, 201; 709/217–219, 709/325, 3, 8, 203, 246, 213; 715/700–867
See application file for complete search history.

(56) References Cited

U.S. PATENT DOCUMENTS

| 5,825,759 | A  | * | 10/1998 | Liu .......................... 370/331 |
| 6,098,108 | A  | * | 8/2000  | Sridhar et al. ............. 709/239 |
| 6,338,117 | B1 | * | 1/2002  | Challenger et al. ......... 711/122 |
| 6,505,200 | B1 | * | 1/2003  | Ims et al. ..................... 707/8 |
| 6,820,116 | B1 | * | 11/2004 | Pyhalammi et al. ........ 709/219 |
| 2002/0009079 | A1 | * | 1/2002 | Jungck et al. ............. 370/389 |
| 2002/0073167 | A1 | * | 6/2002 | Powell et al. .............. 709/217 |
| 2002/0116457 | A1 | * | 8/2002 | Eshleman et al. .......... 709/203 |
| 2004/0009815 | A1 | * | 1/2004 | Zotto et al. ................. 463/42 |

OTHER PUBLICATIONS

Delis et al, May/Jun. 1998, IEEE Transactions on knwledge and data engineering, vol. 10. No. 3.*
Beomseok Nam, Jul. 2, 2000, HotBot.*

* cited by examiner

*Primary Examiner*—Donald Sparks
*Assistant Examiner*—Hashem Farrokh
(74) *Attorney, Agent, or Firm*—Osha Liang LLP

(57) ABSTRACT

A hybrid system for updating cache including a first computer system coupled to a database accessible by a second computer system, said second computer system including a cache, a cache update controller for concurrently implementing a user defined cache update policy, including both notification based cache updates and periodic based cache updates, wherein said cache updates enforce data coherency between said database and said cache, and a graphical user interface for selecting between said notification based cache updates and said periodic based cache updates.

19 Claims, 13 Drawing Sheets

51

HYBRID SYSTEM AND METHOD FOR UPDATING REMOTE CACHE MEMORY WITH USER DEFINED CACHE UPDATE POLICIES

BACKGROUND OF THE INVENTION

1. Field of the Invention

The present invention relates to the field of data processing. More specifically, embodiments of the present invention relate to methods for updating a cache memory in a client server system.

2. Related Art

Changes in technology have profoundly affected how people use computers. For example, the widespread proliferation of computers prompted the development of computer networks that allow computers to communicate with each other. Networks for personal computers were developed to allow individual users to communicate with each other and share resources. In this manner, a large number of people within a company could communicate at the same time with a central software application running on one computer system. As a result of sharing a software application and other resources with numerous users, policies must be defined and enforced that control the access and use of particular applications and resources on a server system. In addition, storing user policies in an accessible and efficient location has become a challenge.

Referring now to Prior Art FIG. 1, a block diagram 10 of a generic server system is shown. The generic server system comprises a user 20 connected to a server 21 by a data connection 24. Typically, user 20 will access an application 22 that is stored on server 21 over the Internet. In a corporate environment, the user 20 could be connected to the server by an internal network e.g., an Intranet. In addition, server 21 stores a set of user policies in a database 23 for authenticating access to software application 22. Typically, the user policy database 23 comprises user names and associated passwords. When a user provides credentials to access secure applications, the credentials are checked against the stored values.

Users on an Intranet have access to applications that would not typically be accessible to users that are not connected to the corporate network. By limiting the use of applications to users connected to the network, marginal security can be provided because only users inside the corporation can access the applications. Although somewhat secure, users may find the configuration inconvenient because many users need to access applications on a corporate server when they are not at the office, e.g., on a business trip or working from home.

To overcome the problem of not being able to access applications when not connected to the Intranet, some networks are configured to allow remote access to a server over the Internet. To achieve secure remote access to a server, corporations create a "portal" for users to login to the server while not connected to the Intranet. Typically, a user will provide credentials such as a user name and password to gain access to the corporate server over the Internet. Once a user has provided accurate credentials, the server system checks a user policy database to verify if the user should have access to the particular application. Often, it is important for the user policies to be customized for different users because many times users do not need access to all applications stored on the server. In addition, there may be security reasons that prohibit everyone from accessing sensitive data such as payroll information. Often there is a hierarchy established to allow different levels of data security. For example on a low security level, information such as intra-office telephone extensions can be stored. On a medium level of security, employee's home address information can be stored. On the highest level of data security is information such as employee salary and company banking information.

For example, user policies defined for a human resources server prevent other personnel from viewing confidential salary information and other sensitive data. Furthermore, user policies for an engineering server allow authorized personnel from many internal segments of a company to publish and share research and development information. At the same time, the user policies restrict external partners from gaining access to proprietary information.

It is beneficial to create specific user policies for all users because it provides a fully customizable and more secure computing environment; but when a company becomes larger with more users and more applications, the user policy database can become very large and complex. For instance, If there are hundreds of employees accessing hundreds of applications, the size of the user policy database can grow exponentially. In addition, it becomes very difficult to update changes made to the policy database.

Although the specific user policies are beneficial for controlling access to sensitive applications, creating and managing such user policies can be a hindrance on the performance of a server system because the server must access a very large user policy database each time an application is accessed. To overcome the problem of accessing a large database every time a user policy is needed, or to effectively access any kind of data in a client-server environment, many remote servers use a cache memory to store recently used data and user policies. By using a cache memory at the client, a user policy can be quickly retrieved without accessing a large database on a remote server, thus increasing the efficiency and speed of a remote server.

It is well known that a cache memory greatly enhances the performance of remote servers, but there are some problems associated with the use of a cache memory. For example, data coherency is a major concern. When data is changed or updated on the central database, it is important to make sure the data stored in the cache memory at the client reflects the changes also. If the data stored on the cache memory is inaccurate, the level of policy enforcement is compromised.

One way to update cache memory is to do periodically access the data store and refresh the cache to reflect the chances made to the database. FIG. 2 is a prior art illustration 20 a remote server 221 that periodically updates a cache 229 by communicating with a data store 205 this is called "pulling". There are many ways to implement this type of cache updating process. For example, remote server 221 could be configured to access data store 205 every night to update the cache memory. Another method implementing periodic cache updates is to set a trust period for a data entry. For example, a user login and password can have a trust period of 1 hour. In this case, the data entry stored in the cache memory will be valid for one hour and after that, it will be cleared from the cache and become invalid. If the server needs the information again, it will access the data store for the information, thus ensuring the data will never be inconsistent for more than one hour.

One concern with using periodic updates is setting the trust period for the data. If the trust period is too long, the data may be inconsistent between the cache memory and the data store. If the trust period is too short, the performance of the server is sacrificed because the server is constantly accessing the data store for data. As a result, using a periodic cache update method requires much experimentation. Even after much trial and error, the performance of the remote server is greatly reduced, thus leaving the user desiring an alternative method.

To alleviate the problems associated with periodic updates, many system administrators use a method of updating cache called notification. FIG. 3 is a prior art illustration 30 of a server system using notification for updating cache 229. In this system, a remote server 221 uses a dedicated data link for receiving notification of data changes from data store 205. Notification relies on the data store 205 to notify remote server 221 that data in the cache is inconsistent with the data stored on the data store. Data store 205 maintains a record of what information remote server 221 has in its cache. When changes are made to a piece of data that resides on the cache on the remote server 221, the data store 205 notifies the remote server 221 that data has changed. Accordingly, after receiving notification, the remote server 221 accesses the data store 205 for the data updates. To alleviate performance and security concerns, a dedicated communication link is often used for notification and updates.

Notification greatly reduces the chances of data inconsistencies, but one area of concern is the security issues associated with an open data link. Having an open data link is very costly and in addition, an open data link is a security concern. In a web server environment, it is desirable to have as few open ports as possible. When using a dedicated data link, it is a requirement to audit what information is being transferred and monitor who is accessing the data. Additionally, when notification is used to update cache, too many notifications to the server greatly compromises the performance of the server.

SUMMARY OF THE INVENTION

A hybrid system for updating cache comprising a first computer system coupled to a database accessible by a second computer system, said second computer system comprising a cache, a cache update controller for concurrently implementing a user defined cache update policy, comprising both notification based cache updates and periodic based cache updates, wherein said cache updates enforce data coherency between said database and said cache, and a graphical user interface for selecting between said notification based cache updates and said periodic based cache updates.

In a server system comprising a processor coupled to a bus and a memory coupled to said bus, a computer readable medium comprising instruction that when executed implement a hybrid method of updating a cache. The method comprising accessing data from a remote database, storing said data in a cache, determining a user specified cache update policy associated with said data, implementing said user specified cache update policy associated with said data, wherein said user specified cache update policy comprises a periodic based cache update policy or a notification based cache update policy, and wherein implementing said user specified cache update policy enforces data coherency between said remote database and said cache, searching a data entry for a predefined trust period, waiting said trust period, and clearing said data entry from a cache.

In a server system comprising a processor coupled to a bus and a memory coupled to said bus, a computer readable medium comprising instructions that when executed implement a hybrid method of updating a cache. The method comprising accessing data from a remote database, storing said data in a cache, determining a user specified cache update policy associated with said data, implementing said user specified cache update policy associated with said data, wherein said user specified cache update policy comprises a periodic based cache update policy or a notification based cache update policy, and providing a graphical user interface for selecting between said periodic based cache update policy or said notification based cache update policy.

Other aspects of the invention will be apparent from the following description and the appended claims.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
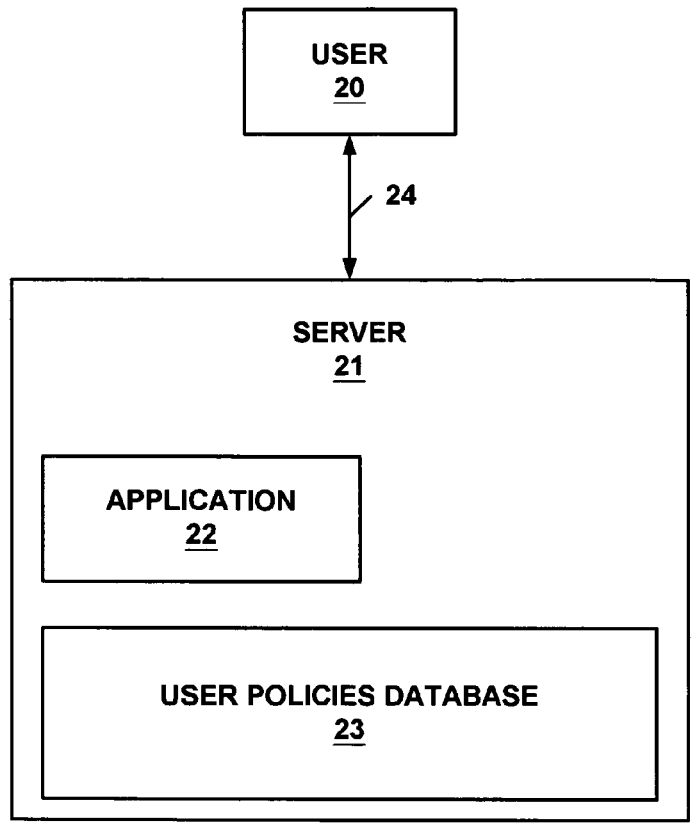
FIG. 1 is a block diagram of a prior art server system including an application stored on a remote server available to a user over a network connection.
Figure 2:
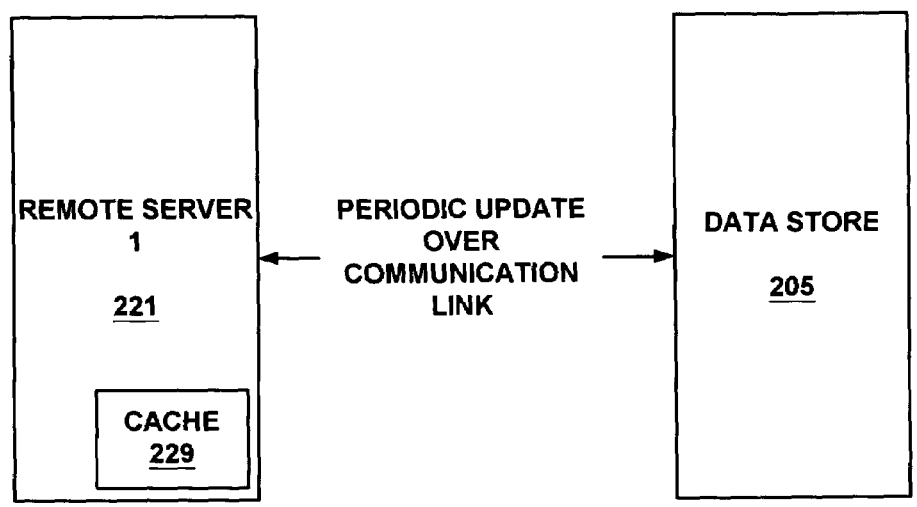
FIG. 2 is an illustration of a prior art system using periodic updates for updating a cache memory.
Figure 3:
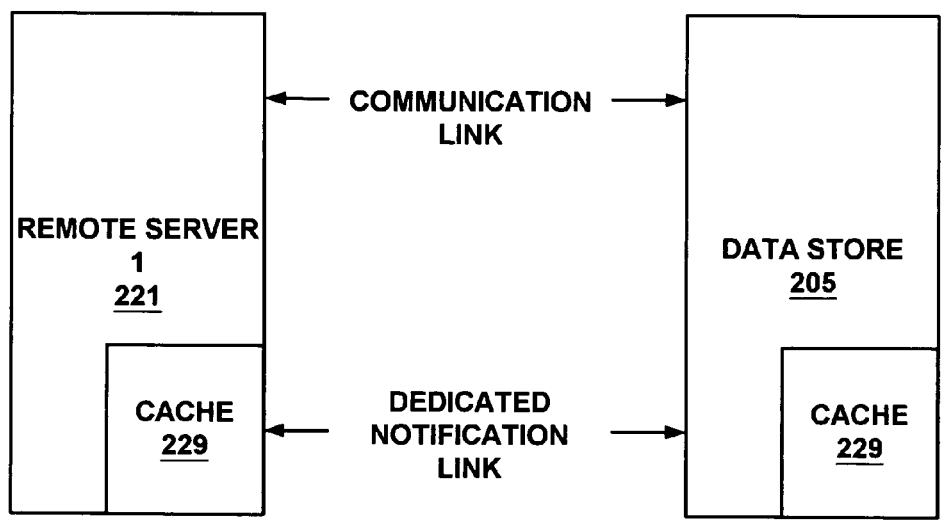
FIG. 3 is an illustration of a prior art system using notification for updating a cache memory.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

NOTATION AND NOMENCLATURE

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "setting," "storing," "scanning," "receiving," "sending," "disregarding," "entering," or the like, refer to the action and processes (e.g., processes 700, 800, 900, and 1000) of a computer system or similar intelligent electronic computing device, that manipulates and transforms data represented as physical (electronic) quantities within the computer system's registers and memories into other data similarly represented as physical quantities within the computer system memories or registers or other such information storage, transmission or display devices.

Figure 4:
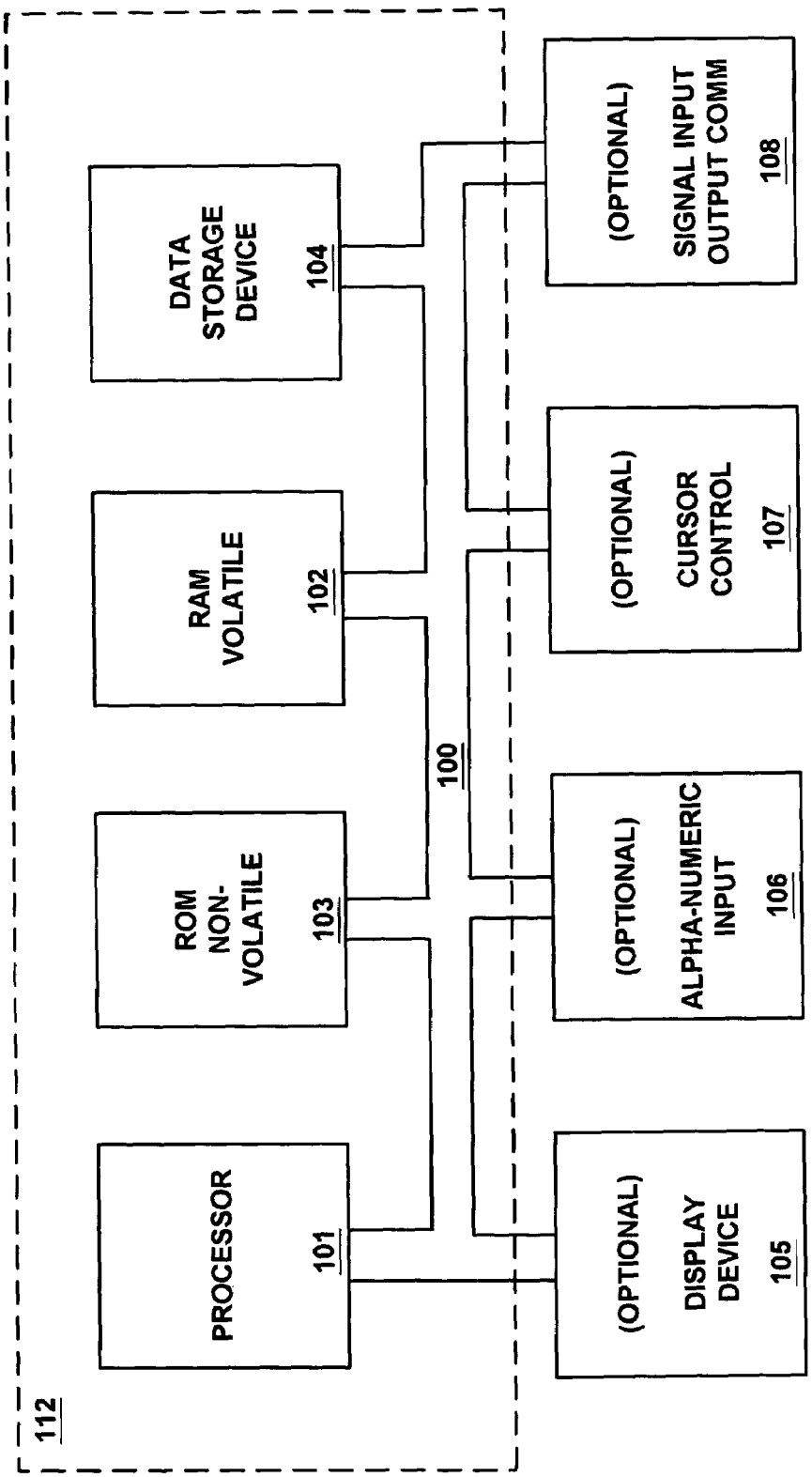
FIG. 4 is a block diagram of an exemplary computer system in accordance with an embodiment of the present invention.

Referring now to FIG. 4, a block diagram of exemplary computer system 112 is shown. It is appreciated that computer system 112 of FIG. 4 described herein illustrates an exemplary configuration of an operational platform upon which embodiments of the present invention can be implemented. Nevertheless, other computer systems with differing configurations can also be used In place of computer system 112 within the scope of the present invention. For example, computer system 112 could be a server system, a personal computer or an embedded computer system such as a mobile telephone or pager system.

Computer system 112 includes an address/data bus 100 for communicating information, a central processor 101 coupled with bus 100 for processing information and instructions, a volatile memory unit 102 (e.g., random access memory, static RAM, dynamic RAM, etc.) coupled with bus 100 for storing information and instructions for central processor 101 and a non-volatile memory unit 103 (e.g., read only memory, programmable ROM, flash memory, EPROM, EEPROM, etc.) coupled with bus 100 for storing static information and instructions for processor 101. Computer system 112 may also contain an optional display device 105 coupled to bus 100 for displaying information to the computer user. Moreover, computer system 112 also includes a data storage device 104 (e.g., disk drive) for storing information and instructions. In one embodiment of the present invention, data storage device 104 is a cache memory.

Also included in computer system 112 of FIG. 4 is an optional alphanumeric input device 106. Device 106 can communicate information and command selections to central processor 101. Computer system 112 also includes an optional cursor control or directing device 107 coupled to bus 100 for communicating user input information and command selections to central processor 101. Computer system 112 also includes signal communication interface 108, which is also coupled to bus 100, and can be a serial port. Communication interface 108 can also include number of wireless communication mechanisms such as infrared or a Bluetooth protocol.

Although the hybrid cache system and method of the present invention may be implemented in a variety of different electronic systems such as a mobile computer system, an embedded system, etc., one exemplary embodiment includes the implementation on a computer server system. It should be understood that the descriptions corresponding to FIG. 4 provide some general information about an exemplary computing system.

A HYBIRD SYSTEM AND METHOD FOR UPDATING REMOTE CACHE MEMORY

The copending patent application Ser. No. 10/246,072, filed on Sep. 17, 2002, entitled "System and Method for Enforcing User Policies on a Web Server," by Chakraborty, is hereby incorporated by reference in its entirety.

Figure 5A:
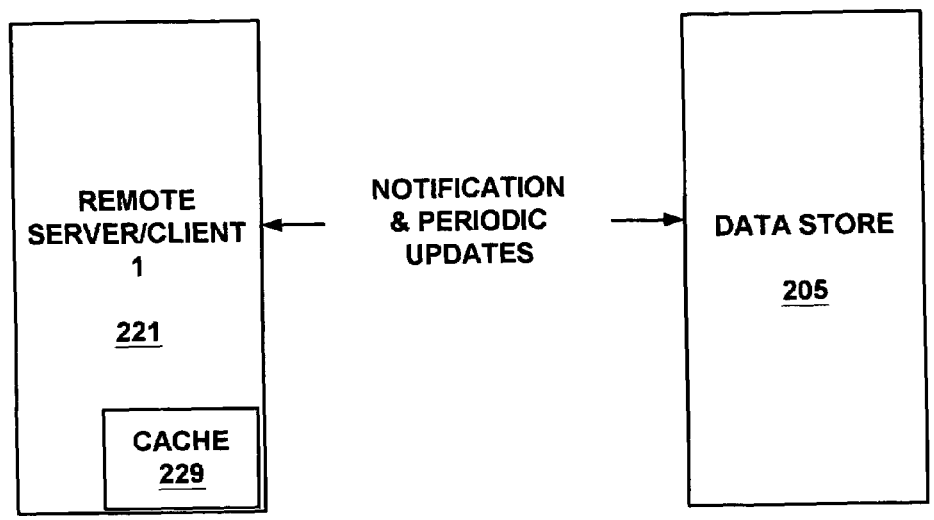
FIGS. 5A and 5B are illustrations of a server system that implements a hybrid system and method for updating a cache memory in accordance with an embodiment of the present invention.
Figure 5B:
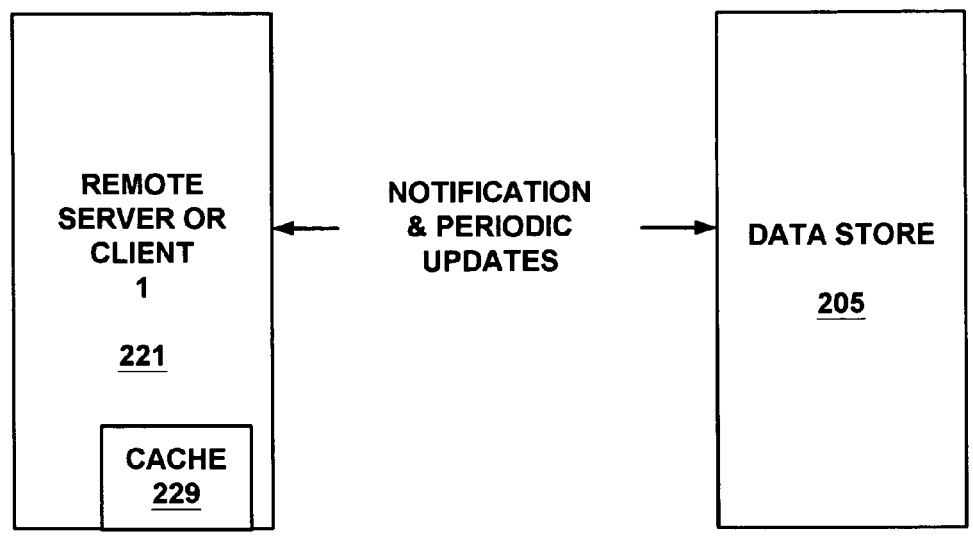

FIGS. 5A and 5B are illustrations 50 and 51 of an exemplary computer server system that uses a hybrid method for updating a cache 229 in accordance with an embodiment of the present invention. It is beneficial to create an update scenario that concurrently utilizes multiple update policies to keep cache memory accurate. The exemplary computer server system of FIG. 5A comprises a data store 205, and a remote server 221. Remote server 221 uses a policy agent to intercept HTTP requests and enforce user policies based on the information accessed from the data store 205 or a cache 229 coupled to the remote server 221.

Initially the remote server accesses user policies stored on data store 205 and once the data is received, it is stored to a cache memory for future reference. Depending on the cache update policies, the data stored in cache memory is updated by multiple methods. For example, if notification is used, the data store 205 will notify remote server 221 that data has been changed. As a result, the remote server 221 will access the data store 205 for an update. Notification updates are used for data that must be very accurate, such as a password or access to sensitive data.

When the data stored in the cache memory can be inconsistent with the data stored on the data store for a short period of time, periodic updates are used to refresh the cache memory. When periodic updates are used, a trust period can be set to establish the timeframe that the data will remain in the cache memory. The trust period is typically set manually, but in one embodiment of the present invention, a default trust period is set. In another embodiment, a default trust period is given to data based on the type of data. Furthermore, a default trust period can set based on the particular user that is trying to access the remote server.

Data store 205 comprises a database that keeps track of the data that remote server 221 has requested. As a result, when changes are made on the data store 205, only the remote server(s) using the data that was changed will receive notification of the change. This results in a more efficient server system because a remote server does not waste resources updating data that is not stored in a cache memory.

Figure 6:
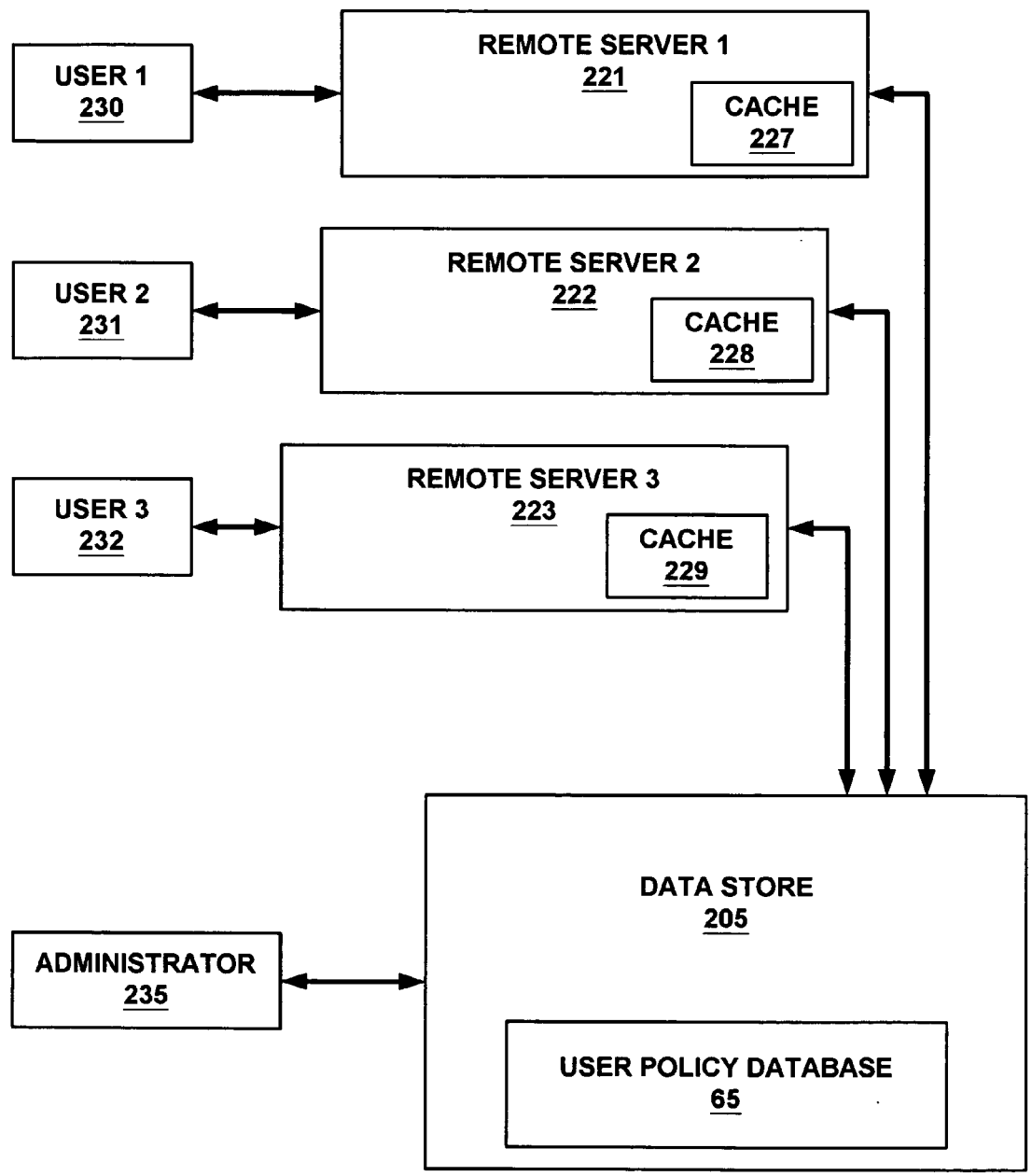
FIG. 6 is a block diagram of an exemplary server system comprising a plurality of remote servers sharing a data store in accordance with an embodiment of the present invention.

FIG. 6 is an illustration of a server system comprising multiple remote servers sharing one data store in accordance with an embodiment of the present invention. In FIG. 6, there are three remote servers sharing the user policy database 65 on data store 205. In one embodiment, an administrator 235 has access to the data store 205. The administrator can make changes to the user policy database, set the type of cache update method, and set the trust period associated with periodic updates.

When user one 230 accesses remote server one 223 for a resource, the policy agent will intercept the request and check for proper credentials, e.g., a cookie or token on the header portion of an HTTP request. If a token is not found, the user will be directed to an authentication application. If a token is found, the remote server will access the user policy database 65 stored on database 205 to retrieve the user policy for user one 230. Once the policy is accessed, the policy will be stored in cache memory 227 for future reference.

Based on the type of cache update method associated with the data in the cache memory, updates will occur periodically or the remote server will update the cache after being notified by the database 205 that the data has changed. For example, suppose remote server two 222 is a corporate portal server. When user two 231 tries to access resources controlled by remote server two 222, a cookie must be present in an HTTP request to access the resources. If the is cache updated using periodic updates, the user policy stored in the cache memory 228 on server two 222 will be cleared after the trust period has expired. If user two 231 tries to access remote server two 222 again, remote server two 222 must access data store 205 for the information again. If the administrator 235 had changed the user policy database 65 during the trust period, the data in the cache memory 228 would not have been consistent with the data on the data store 205. Only after the trust period has expired and the data in the cache memory is cleared will the remote server access the data store 205 for accurate data. The trust period can be set to achieve the desired level of data consistency. The trust period should be short enough to ensure the desired level of data consistency, and long enough to ensure performance of the remote server. If the cache memory update was performed using notification, remote server two 222 would be notified by database 205 when data in the cache memory 228 is inconsistent with the data stored in the user policy database 65 and an update would occur.

Figure 7:
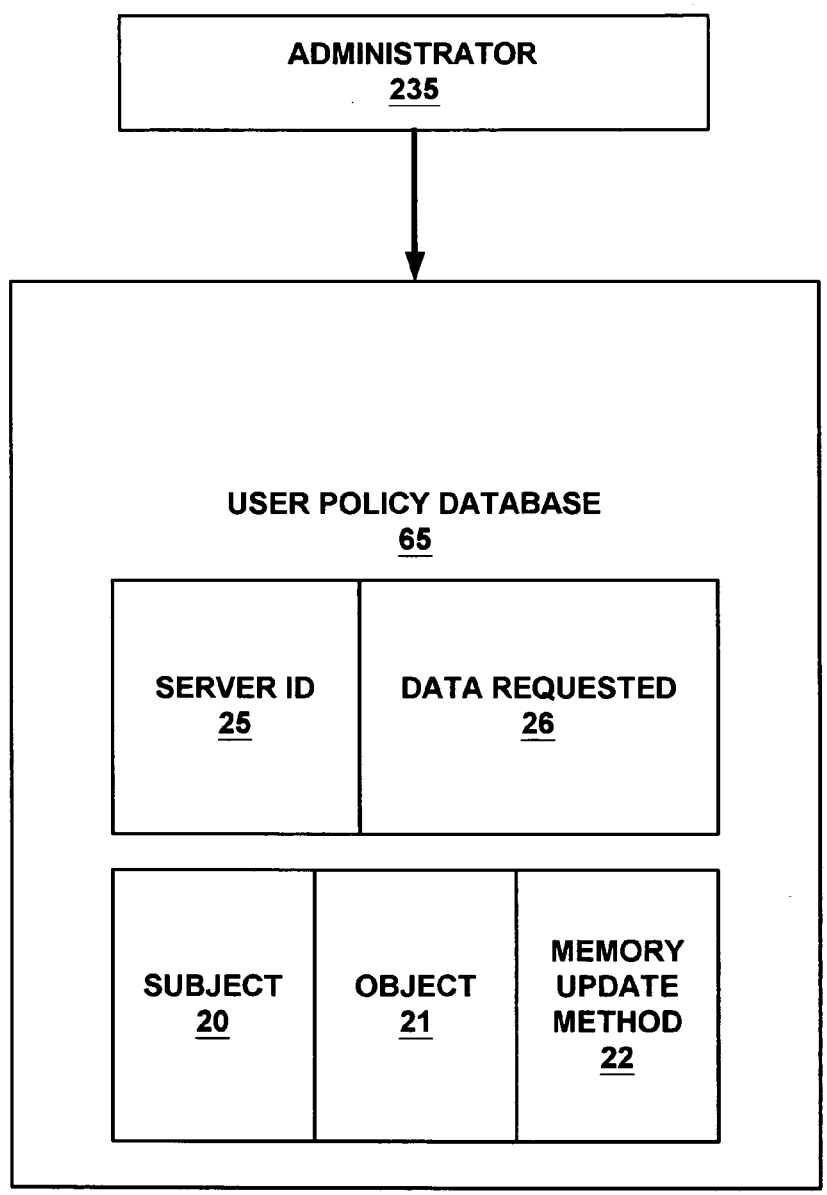
FIG. 7 is a block diagram of an exemplary user policy database in accordance with an embodiment of the present invention.

FIG. 7 is a block diagram 85 of a user policy database in accordance with an embodiment of the present invention. The user policy database 65 comprises a plurality of data entries that contain user policies as well as policies for cache updates. For example, user policy database can keep a record of the data sent to different remote servers. This is useful for notification updates because only the servers that have inconsistent data are sent notification of data changes.

In FIG. 7 the user policies database 65 comprises a server identification entry 25 and a corresponding record of data requested 26. The data store 205 maintains a record of the remote servers that are accessing data in the server identification record 25. When a particular remote server requests data the data store updates the data requested record 26 with the appropriate entry including the remote server id and the data requested. If notification is used to update a cache and data has changed since it was stored in cache, the remote server(s) that have the data stored in cache will receive a notification that data has changed and an update will occur.

In one embodiment of the present invention, cache updates can be set differently for many data types. In a user policy database, user policies are defined by a subject field 20 and an object field 21. The subject field 20 is typically a user name, but it could be any designation for a user or a group of users. The object field is typically an application or a web resource but it could be any data accessible from the server. In one embodiment of the invention, the user policy database comprises a field used for designating the method of cache update associated with different user policies. Defining a specific type of cache update for individual user policies creates a customizable environment for managing cache memory. Furthermore, an administrator 235 can access the user policy database and change the cache update method for particular user policies. When defining a method for cache updates, the administrator 235 can choose to enable notification or choose to set a trust period for periodic updates.

Figure 8:
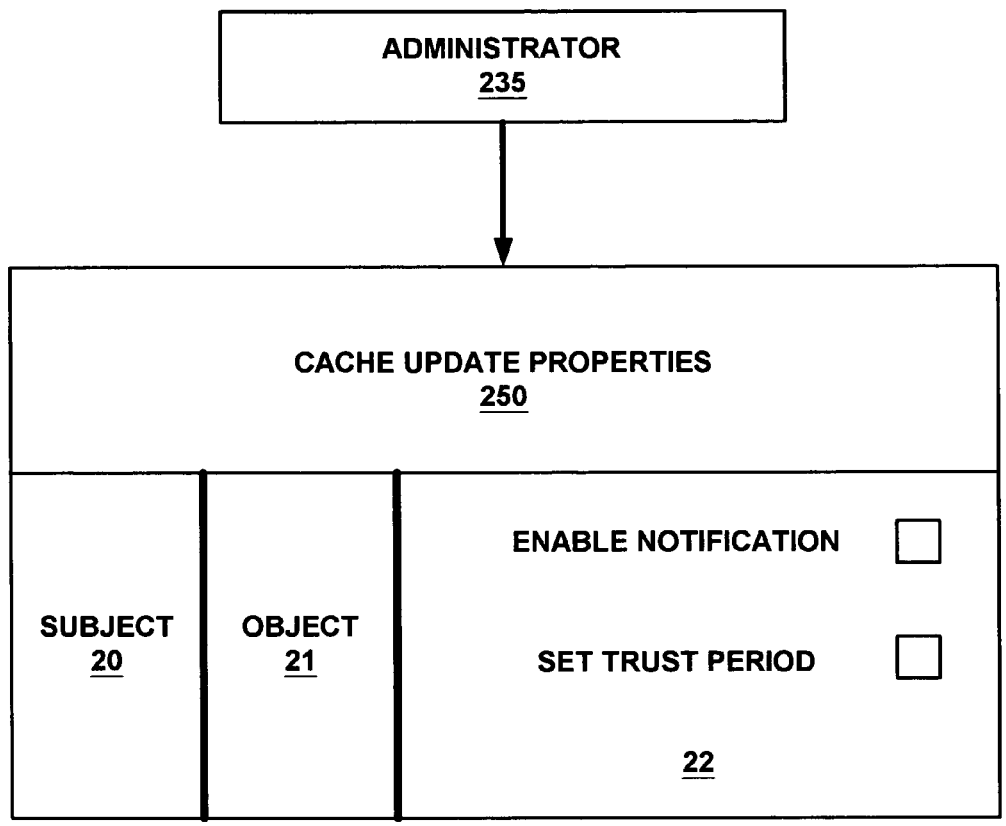
FIG. 8 is a block diagram of an exemplary dialog box used to change cache update properties on a server system in accordance with an embodiment of the present invention.

FIG. 8 is an illustration 40 of a dialog box used by an administrator to set cache update properties in accordance with an embodiment of the present invention. An administrator 235 typically sets the cache update properties 250 by choosing to enable notification or by setting a trust period. As mentioned previously, a user policy can comprise a subject 20, an associated object 21 and an associated cache memory update method 22. If notification is enabled, the remote server accessing the data store will be notified when data stored in a cache memory has been changed. If a trust period is set, data stored in a cache memory will be valid for a specified period of time and after that time period, the data will be cleared from cache.

Figure 9:
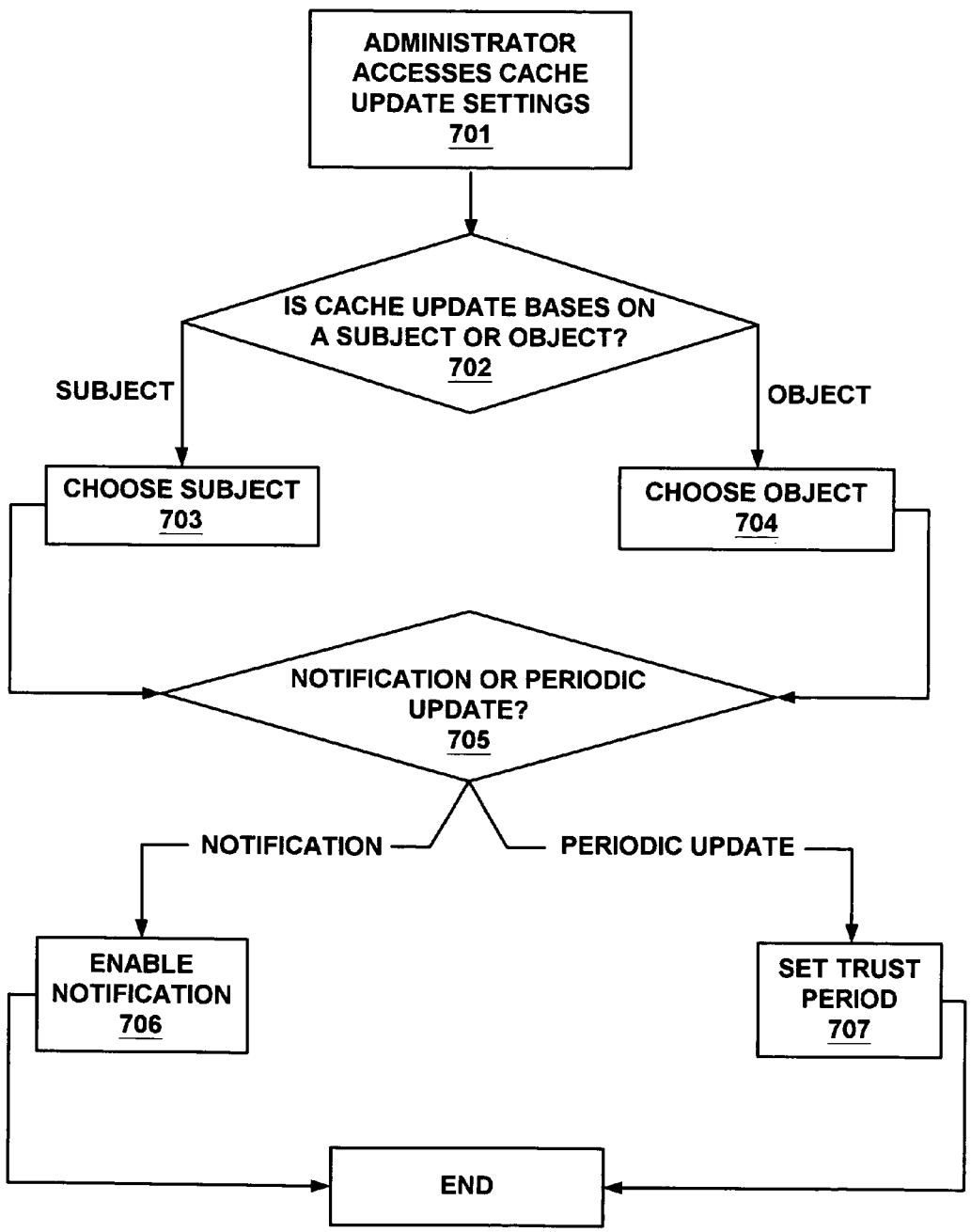
FIG. 9 is a flow diagram of an exemplary computer implemented process for setting cache update properties in accordance with an embodiment of the present invention.

FIG. 9 is a flow diagram 700 of the process of selecting a cache update policy for a particular data entry. The first step 701 is for an administrator to gain access to the cache update settings. The next step 702 is to determine the cache settings are for an object such as an application or for a subject such as a particular user 702. If the cache update settings are for a subject, the next step 703 is to select the particular subject to modify the cache settings for. Similarly, if the cache updates are based on an object, the particular object must be selected 704. The next step 705 is to select the type of cache update for the specified subject or object. If data is to be updated when changes are made on the data store, then notification is enabled 706. If periodic updates are used to refresh the cache, a trust period can be set. In one embodiment of the invention, a default trust period is set if one is not specified. Once the cache update preferences are set, the cache memory on the remote servers will be updated according to the selected cache update preferences.

Figure 10:
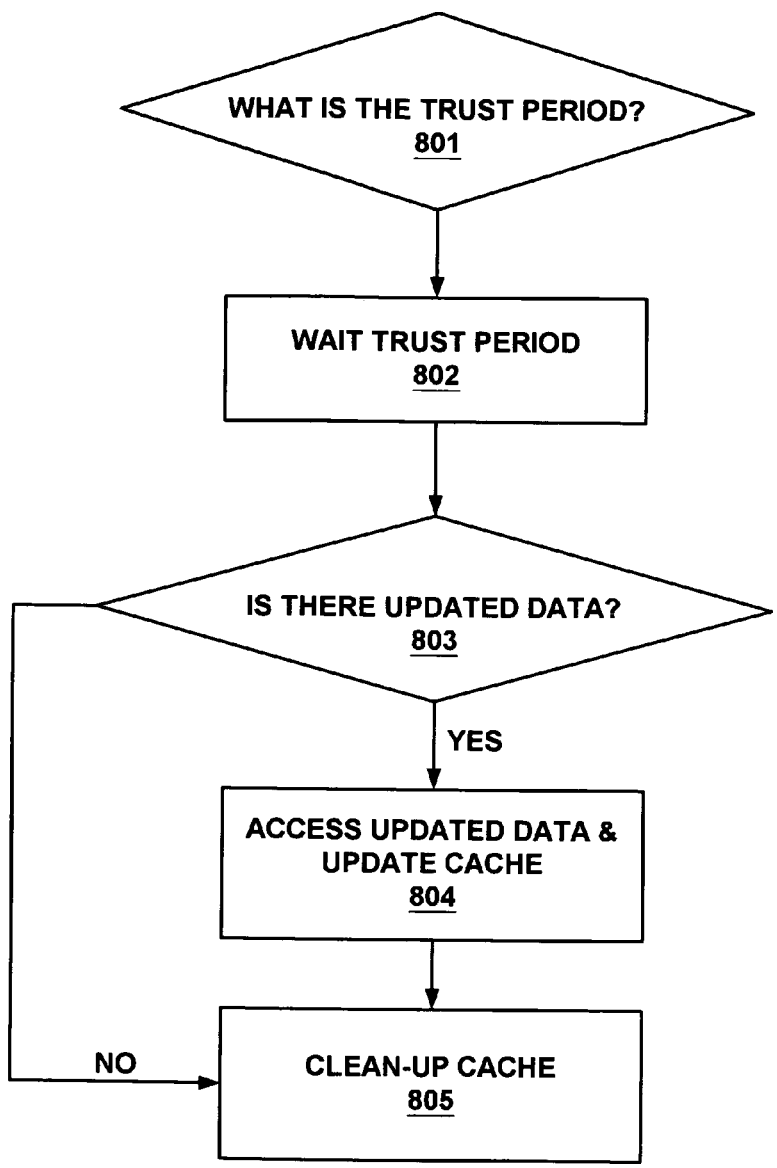
FIG. 10 is a flow diagram of an exemplary computer implemented process using periodic updates to update a cache memory in accordance with an embodiment of the present invention.

FIG. 10 is a flow diagram of the steps performed on a remote server to update cache memory using periodic updates. The first step 801 is to identify the trust period of the data 801. Once the trust period is identified, the remote server waits the trust period after storing data to cache memory 802. After waiting the trust period the remote server accesses the data store to access updated data 803. If the data has been changed, the changes are accessed 804 and stored to cache. Finally, in step 805, the cache is cleared of all expired data. If the data has not been changed on the data store, the data stored in cache memory is cleared 805.

Figure 11:
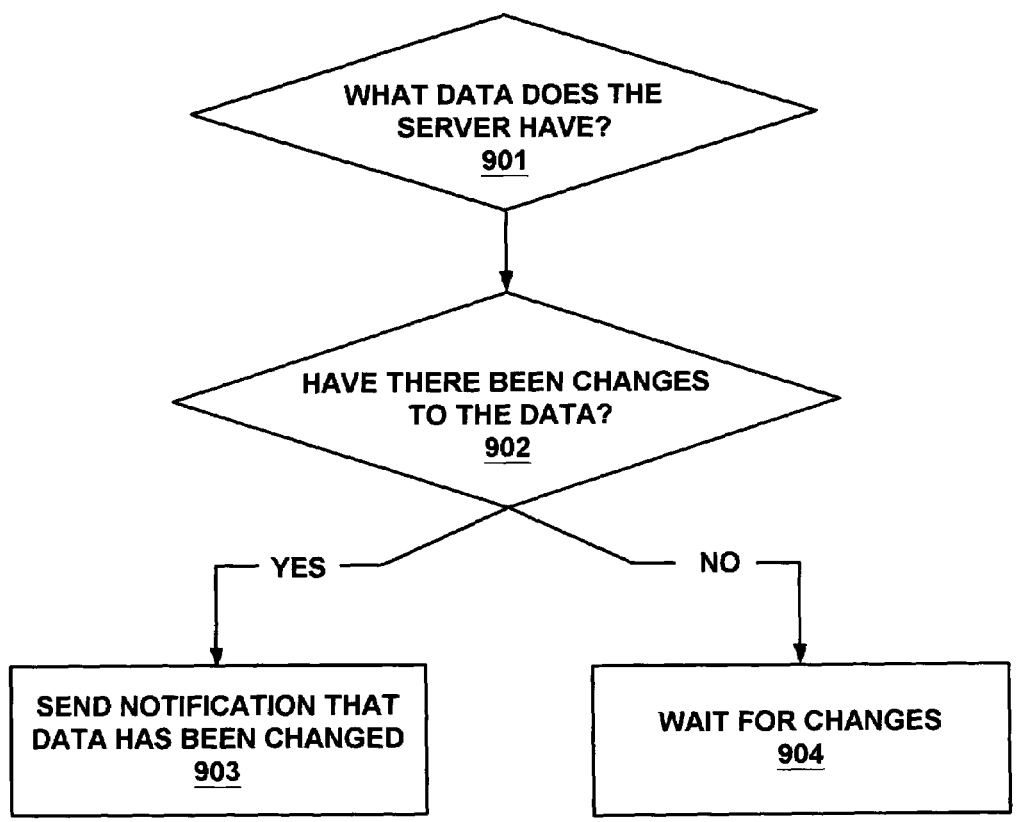
FIG. 11 is a flow diagram of an exemplary computer implemented process used for sending notification to a remote server in accordance with an embodiment of the present invention.

FIG. 11 is a flow diagram of the steps performed by a data store when using notification to update cache memory. First the server identifies what data a remote server has requested. As mentioned above in FIG. 7, the data store stores the data requested by particular remote servers. Once the data store has identified the data requested by a remote server, the data store waits for changes to be made to data that has been requested by a particular server. The next step 902 is to identify if there have been changes to data. If a change has been mage, the data store sends notification to the remote server that data has changed 903. Once notified, the remote server can access the data store and update the cache memory. If changes have not been made to the data, the data store waits for changes to be made 904.

Figure 12:
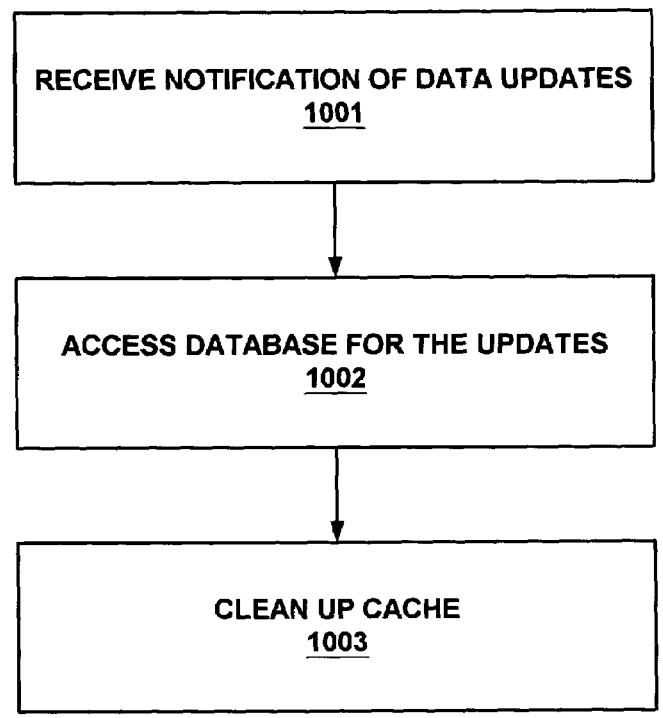
FIG. 12 is a flow diagram of an exemplary computer implemented process used for accessing data after receiving notification that data has changed.

FIG. 12 is a flow diagram 1000 of the steps performed on a remote server when using notification to update a cache memory. The first step 1001 is the remote server receives notification that data has changed on the data store. The remote server then accesses the data store to retrieve the new data and update the cache memory 1002. The remote server then clears the cache of old data 1003.

Embodiments of the present invention, a hybrid system and method for updating a remote cache have been described. While the present invention has been described in particular embodiments, it should be appreciated that the present invention should not be construed as limited by such embodiments, but rather construed according to the following claims.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and it's practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A hybrid system for updating cache comprising:
   a first computer system coupled to a database accessible by a second computer system, said second computer system comprising a cache;
   a cache update controller for concurrently implementing a user defined cache update policy comprising both notification based cache updates and periodic based cache updates wherein said cache updates enforce data coherency between said database and said cache; and
   a graphical user interface for selecting between said notification based cache updates and said periodic based cache updates.

2. A system as described in claim 1 wherein said first computer system is a data store.

3. A system as described in claim 2 wherein said second computer system is a remote content server.

4. A system as described in claim 1 wherein said cache stores a user policy utilized for enforcing access to resources on a web server.

5. A system as described in claim 4 wherein said user policy enforces access to information on a web server.

6. A system as described in claim 1 where said cache updates are application specific.

7. A system as described in claim 1 wherein said cache updates are user specific.

8. A hybrid method for updating a cache in a network environment comprising:
   accessing data from a remote database;
   storing said data in said cache;
   determining a user specified cache update policy associated with said data wherein a periodic based cache update method or a notification based cache update method can be specified;
   executing said cache update policy associated with said data, wherein executing said cache update policy enforces data coherency between said remote database and said cache; and
   providing a graphical user interface for selecting between said periodic based cache update policy or said notification based cache update policy.

9. A method as described in claim 8 wherein said remote database is on a directory server.

10. A method as described in claim 8 wherein said cache update policy is application specific.

11. A method as described in claim 8 wherein a notification based cache update policy is specified for sensitive data.

12. A method as described in claim 8 wherein a periodic based cache update policy is selected for non-sensitive data.

13. In a server system comprising a processor coupled to a bus and a memory coupled to said bus, a computer readable medium comprising instruction that when executed implement a hybrid method of updating a cache said method comprising:
   accessing data from a remote database;
   storing said data in a cache;
   determining a user specified cache update policy associated with said data;
   implementing said user specified cache update policy associated with said data wherein said user specified cache update policy comprises a periodic based cache update policy or a notification based cache update policy, and wherein implementing said user specified cache update policy enforces data coherency between said remote database and said cache;
   searching a data entry for a predefined trust period;
   waiting said trust period; and
   clearing said data entry from a cache.

14. A computer readable medium as described in claim 13 wherein said remote database is on a directory server.

15. A computer readable medium as described in claim 13 wherein said cache update policy is application specific.

16. A computer readable medium as described in claim 13 wherein said notification based cache update policy is defined for sensitive data.

17. In a server system comprising a processor coupled to a bus and a memory coupled to said bus, a computer readable medium comprising instruction that when executed implement a hybrid method of updating a cache said method comprising:
   accessing data from a remote database;
   storing said data in a cache;
   determining a user specified cache update policy associated with said data;
   implementing said user specified cache update policy associated with said data wherein said user specified cache update policy comprises a periodic based cache update policy or a notification based cache update policy;
   accessing a remote database for data updates after clearing said cache; and
   providing a graphical user interface for selecting between said periodic based cache update policy or said notification based cache update policy.

18. In a server system comprising a processor coupled to a bus and a memory coupled to said bus, a computer readable medium comprising instruction that when executed implement a hybrid method of updating a cache said method comprising:
　accessing data from a remote database;
　storing said data in a cache;
　determining a user specified cache update policy associated with said data;
　implementing said user specified cache update policy associated with said data wherein said user specified cache update policy comprises a periodic based cache update policy or a notification based cache update policy;
　waiting for a notification that data in a cache is inconsistent with data stored on a remote database;
　accessing said remote database;
　updating a cache to reflect said database;
　clearing said cache of inconsistent data; and
　providing a graphical user interface for selecting between said periodic based cache update policy or said notification based cache update policy.

19. In a server system comprising a processor coupled to a bus and a memory coupled to said bus, a computer readable medium comprising instructions that when executed implement a hybrid method of updating a cache said method comprising:
　accessing data from a remote database;
　storing said data in a cache;
　determining a user specified cache update policy associated with said data;
　implementing said user specified cache update policy associated with said data wherein said user specified cache update policy comprises a periodic based cache update policy or a notification based cache update policy; and
　providing a graphical user interface for selecting between said periodic based cache update policy or said notification based cache update policy.

* * * * *

UNITED STATES PATENT AND TRADEMARK OFFICE
CERTIFICATE OF CORRECTION

| | |
|---|---|
| PATENT NO. | : 7,020,750 B2 |
| APPLICATION NO. | : 10/246613 |
| DATED | : March 28, 2006 |
| INVENTOR(S) | : Pirasenna Thiyagarajan et al. |

It is certified that error appears in the above-identified patent and that said Letters Patent is hereby corrected as shown below:

On the Title Page, Item (75) col. 1, Inventors, please correct the second inventor's last name from "Thiyagaranjan" to --Thiyagarajan--.

Signed and Sealed this

Twenty-second Day of August, 2006

JON W. DUDAS
*Director of the United States Patent and Trademark Office*